Inventor
A. KÉGRESSE
By Young, Emery & Thompson
Attorneys

April 27, 1948.
A. KÉGRESSE
2,440,590
PRESSURE SELECTOR AND CORRECTOR FOR BOUND-UP
AUTOMATIC HYDRAULIC TRANSMISSIONS
Filed Jan. 18, 1939
2 Sheets-Sheet 2
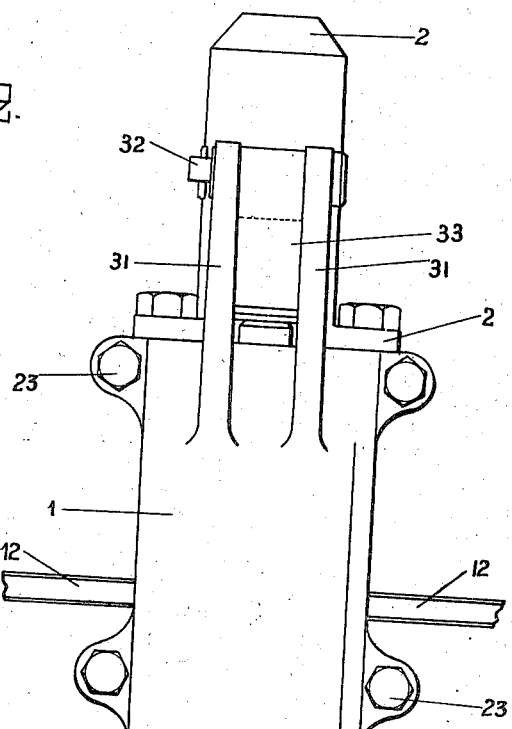
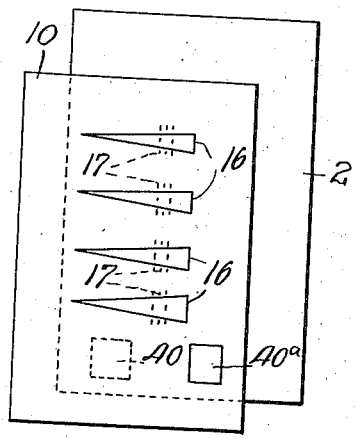
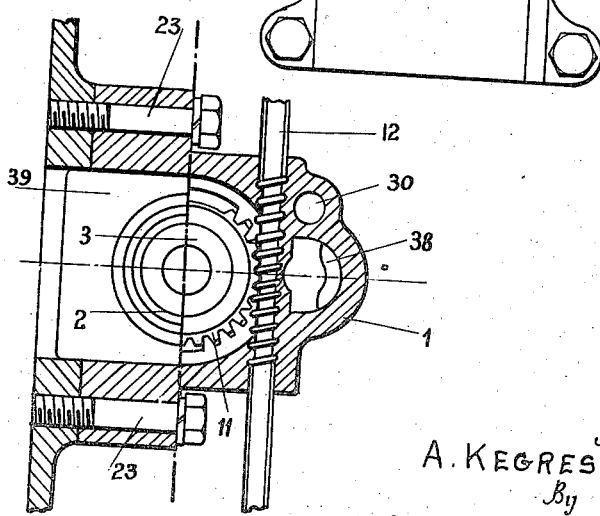
Inventor
A. KÉGRESSE
By
Young, Emery & Thompson
Attorneys Patented Apr. 27, 1948

2,440,590

UNITED STATES PATENT OFFICE 2,440,590

PRESSURE SELECTOR AND CORRECTOR FOR BOUND-UP AUTOMATIC HYDRAULIC TRANSMISSIONS

Adolphe Kégresse, Paris, France

Application January 18, 1939, Serial No. 251,640
In France January 21, 1938

Section 3, Public Law 690, August 8, 1946
Patent expires January 21, 1958

9 Claims. (Cl. 137—139)

This invention relates to a pressure selector and corrector for bound up automatic hydraulic transmissions.

The device according to this invention is adapted more particularly for bound up automatic hydraulic transmissions for motor cars, in which the change of gear is obtained by the engagement of different clutches by means of a fluid pressure, and in which the fluid can be advantageously the lubricating oil. The said device is inserted into the circuit of the fluid between the pump and the clutches.

A pressure corrector for bound up automatic hydraulic transmissions with variable speeds has already been disclosed in the French Patent No. 818,831, dated June 10, 1936. This device gives automatically or manually the fluid pressures which correspond to the speeds to be obtained.

However, while perfectly giving the desired pressures for "higher gears," the said device does not work in the same manner for "lower gears."

Moreover, this known device is not a manifold device, that is to say it is provided only for a single fluid outlet. Thus, it is adapted only for transmissions in which the selection of the pressures corresponding to the various speeds is effected in the transmission mechanism itself by means of loaded flaps or the like (see for instance the French Patents No. 806,189 and No. 813,616 dated September 2, 1935, and February 10, 1936). Thus, this device cannot be used for transmissions with selected pressures.

Now, the combination of the selector-corrector device with the transmission device itself plays a large part in the operation of the whole mechanism, for it is for a large part this combination on which the rapidity of accomplishment of the changing speed operations will depend, which follow the operations which have been accomplished automatically or manually in the selector-corrector.

It is thus desirable to have a connection corrector-transmission which is as short as possible. The device must be, in some manner, integral with the transmission.

The present invention relates to a pressure corrector-selector insuring automatically or manually the selection of the pressures which correspond to the speeds of the transmission as well for "higher gears" as for "lower gears." The invention also relates to the manner in which the said device is mounted on the casing of the transmission.

An embodiment of the invention is shown by way of example in the appended drawings, in which Figure 1 is a sectional elevational view of the device and shows furthermore the connection of the same with the casing of the transmission.

Figure 2 is a side view of the device.

Figure 4 is a top plan view showing two half sectional views through the line 4—4 of Figure 1.

Fig. 5 is a diagrammatic developed view showing the arrangement of ports.

Figure 1:
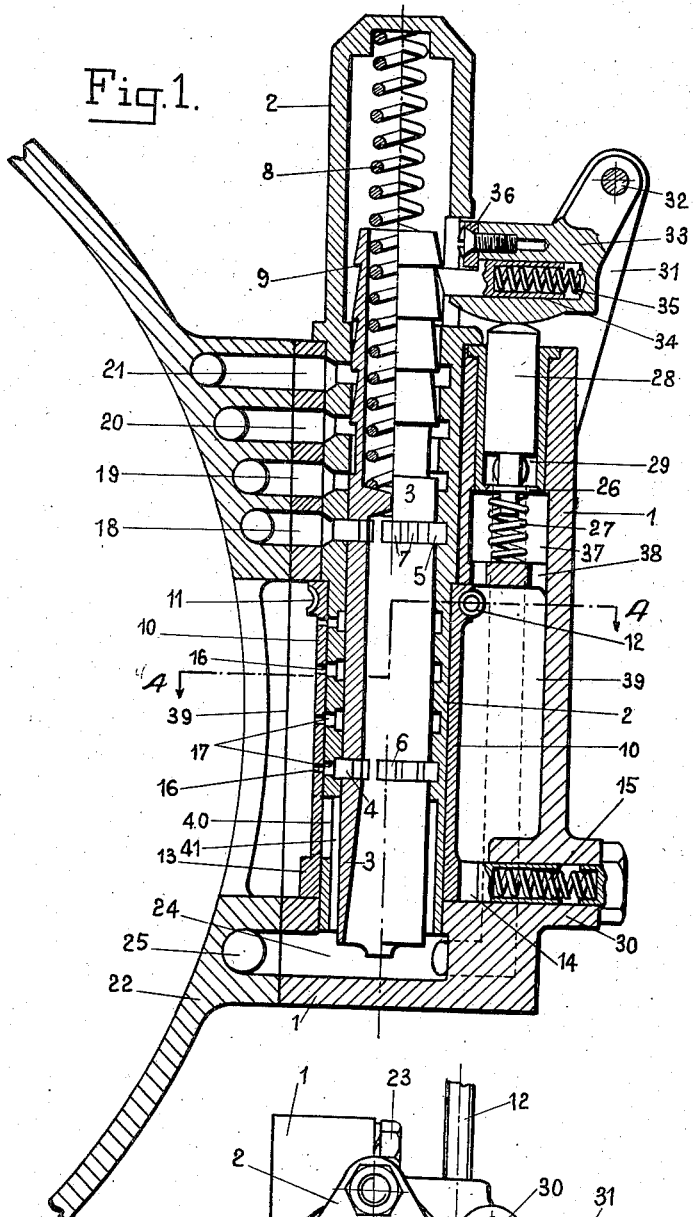

The pressure is supplied by a pump which is completely independent of the device and preferably located in the casing of the transmission itself, the fluid which is used being the lubricating oil.

The described selector-corrector is provided for four speeds. It is formed of a body 1 receiving all the parts of the device.

In the body 1 is fixedly secured a sheath 2 provided inwardly with two groups of four grooves.

The four lower grooves serve to limit the pressure; the four upper grooves are fluid delivery grooves each of which delivers fluid for a different speed.

Inwardly of the sheath 2 moves a long hollow piston 3 provided with a full partition in its middle part.

The lower part of the piston 3 is mounted with a sliding fit and provided with two outer grooves 4 and 5 which communicate with the hollow lower part through openings 6 and 7.

The upper hollow part of the piston 3 is adapted to receive a spring 8 an end of which rests on the full wall of the piston, while the other end rests on the top of the sheath 2.

The outer wall of the upper part of the piston 3 is provided with circular grooves 9 having the form of saw teeth and the number of which is equal to the number of speeds of the transmission.

The lower part of the sheath 2 is covered with a circular housing 10 with comparatively thin walls which is adjusted with a sliding fit on the sheath 2.

The housing 10 is formed at its upper end as a gear 11 which is driven by a rope or a rod formed as a rack 12. The said rope 12 is connected with a handle in the reach of the hand of the driver, but not shown in the drawing.

The other end of the circular housing 10 serves as a bolt and forms, for this purpose, an enlarged part 13 which is provided, in a known manner, with notches each of which corresponds to each speed. A finger 14 (see Figure 1) urged by a spring 15 and engaging the notches gives to the housing 10 well predetermined positions. Openings 16 (see Figure 1) of a suitable form are provided in the circular housing 10 and each of them corresponds to one of the four grooves of the lower group of the sheath 2 through the medium of the ports 17. The form of the said ports 16 is similar to the form of the ports which have been described in the first named patent specification. In this connection see Fig. 5.

The four grooves of the upper group of the sheath 2 are put in communication, through ports 18, 19, 20 and 21, with the ducts opening into the clutches for the first, second, third and fourth gear. The said ducts are provided in the wall of the casing 22 itself on which the body 1 of the selector-corrector is directly fixed in a fluid-tight manner through the screws 23 (see Figure 4).

A cavity 24 is provided in the lower part of the device. The said cavity is in direct communication, through the port 25 provided in the wall of the casing 22 itself, with the delivery side of the feeding pump, which is not shown in the drawing.

Figure 3:
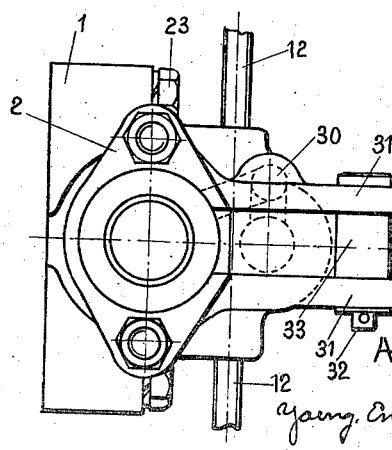
Figure 3 is a top plan view of the same.

Parallel with the long axis of the device is mounted a valve 26 maintained applied onto its seat by the spring 27. The body 28 of this valve serves as a guide for the latter and forms moreover with the valve 26 an annular space 29 which communicates through the opening 30 (shown in dotted lines in Figures 1 and 3) with the cavity 24 and, accordingly, with the feeding pump.

The upper part of the body 1 is extended by two arms 31 between which a tilter 33 is mounted on an axis 32.

The said tilter 33 carries a cylindrical finger 34 urged by a spring 35. At the end opposed to the spring the finger 34 forms a flat on which is adjusted a small plate 36 adapted for preventing the finger 34 from rotating and for limiting the stroke of this finger in the direction of the thrust of the spring 35.

This whole device forms an escapement tilter. In fact, the link point 32 is so chosen that the acute angle of the grooves in the form of saw teeth of the piston 3 causes the tilter 33 to rock about 32, thus allowing the finger 34 to escape for a predetermined downward stroke of the piston.

The hollow space 37 provided under the valve 26 communicates through the openings 38 with the chamber 39 which in its turn opens into the transmission casing 22.

The sheath 2 is provided in its lower part with a large rectangular port 40 constantly communicating with the cavity 24 through the annular space 41.

The circular housing also carries a large port 40a which corresponds to the above mentioned port and which is brought to a position in which it registers with the latter in the "stopping" position, as already known.

Figure 1 shows the device in the first gear position.

The circular housing 10 which is controlled manually by means of the rack-rope 12 and of the gear 11 can rotate by a certain angle and take five positions four of which are well defined and fixed by the locking system 13, 14, 15.

The four defined positions correspond to the "stopping" position and to the three lower gear positions. The fifth position is a variable position and corresponds to a locking position; it gives the high gear with a variation of the automaticity for shifting to the lower gears.

This arrangement is already known and has been more particularly described in the French Patent No. 818,831 dated June 10, 1936.

As above mentioned, the large port 40 is open in the "stopping" position. Thus, all the oil coming from the pump flows into the annular space 41 and through the port 40 and returns to the casing 22 through the chamber 39. The device is then out of action and the piston 3 occupies its lowest position. All the grooves of the sheath 2 are covered.

By bringing the circular housing 10 to the first gear position the port 40 is obstructed. Thus the pressure rises in the cavity 24 and, accordingly, in the hollow piston 3. This latter is driven upwardly while compressing the spring 8 and setting the tilter 33 for the action of the first groove in form of saw teeth on the finger 34.

The piston 3 reaches its first gear position when its groove 4 reaches the level of the first groove of the sheath 2. This groove is then put in communication with the chamber 39 through the ports 17 and 16.

That is the position shown in Figure 1.

In this position the groove 5 of the piston 3 will be opposite the first groove of the upper group of the sheath 2, the said groove communicating with the first gear duct through the opening 18.

Thus the fluid under pressure will feed the said duct, the fluid which is delivered in excess flowing through the ports 17 and 16 and the chamber 39 for returning to the casing. The load of the spring 8 will fix the pressure which is necessary for holding the piston immovable in this position.

Now, if the ports 16 and 17 are largely obstructed through rotating the circular housing 10 by a certain angle, the pressure will rise in the hollow piston 3, which will result in driving this piston upwardly while compressing the spring 8 still further.

Then the grooves 4 and 5 will come successively opposite the corresponding grooves of the fixed sheath 2 and stop for a shorter or longer period of time opposite the latter grooves according as the ports 16 and 17 are more or less open. Then the groove 5 will feed the speed corresponding to the considered position during more or less time.

When shifting to "higher" gears, changing from one gear to another will result in setting the tilter 33 on the operation speed, as has been effected for the first gear.

Assuming now that the device occupies the high gear position and that the speed of the engine decreases, thus producing a diminution of the pump delivery, the piston 3 will tend to move downwardly under the action of the spring 8 and this the more distinctly, the more the ports 16 and 17 will be open.

On its downward stroke the piston 3 will carry with it through the sharp edge of the saw teeth groove of the high gear the finger 34 and the tilter 33 which will rock about the point 32. While pressing against the body 28 of the valve 26, the tilter will unseat this valve and thus provide a complementary passage for the fluid. This will result in causing the pressure almost instantaneously to fall in the cavity 24 and thus under the piston 3. At this moment the piston will accelerate its downward movement and its grooves 4 and 5 will leave the corresponding grooves of the sheath 2 (the grooves of the high gear in the case under consideration) and stop in front of the grooves of the lower gear, provided, however, that the delivery of the pump, which depends on the speed of the engine, is sufficient for maintaining the pressure which is necessary for the third gear. During this sudden downward movement of the piston 3 the finger 34 on pivoting about the axis 32 of the tilter 33, the position of which axis has been judiciously chosen, will escape from the saw teeth groove of the high gear and return to its initial position under the action of the spring 27 which will simultaneously re-seat the valve 26. The device is then ready to be operated for shifting the third gear. If, at this moment, the delivery of the pump increases sufficiently for causing the pressure to rise, the piston 3 will take again the high gear position, the finger 34 of the tilter 33 yielding in order to allow of the passage of the saw teeth groove which then works on the said finger by its sloping part.

On the contrary, if the delivery of the pump decreases still further owing to a larger decrease of the engine speed, the piston 3 will continue its downward movement, thus carrying again with it the tilter and the valve 26, and the operation which has been effected between the high gear and the third gear will be repeated between the third and the second gear and so on each time a variation of the pump delivery, i. e. a change in the speed of the engine, will cause a rather substantial variation of the pressure.

It may thus be seen that the device corresponds well to the requirements which have been exposed in the preamble; it permits to obtain the shifting to "lower gears" automatically or manually; it insures simultaneously with the variation of the fluid delivery the distribution of the said fluid into each of the clutches which corresponds to the various speeds. It is mounted directly on the transmission case, thus eliminating any removable pipe branch and, furthermore, reducing the course of the fluid to a minimum, which insures the maximum of rapidity in the operation.

I claim:

1. A control valve of the character described, comprising a casing having a cylinder provided with two sets of ports, means for controlling the flow through the ports of one set, a hollow piston reciprocably mounted in said cylinder, said piston having one port adapted to register with one of the set of flow controlled ports of the cylinder and a second port adapted to register with one of the other set of ports of the cylinder, a chamber for fluid under pressure, said piston having a closed end and an open end, the latter and the corresponding end of the cylinder opening into said pressure chamber so that fluid will flow through the piston ports and through the registering cylinder ports, means for resiliently opposing movement of the piston under the action of fluid pressure, a valve for releasing the fluid from the pressure chamber, and means operable upon movement of the piston by the spring for opening the release valve.

2. In a pressure selector-corrector for automatic hydraulic transmissions, an elongated piston, an elongated fixed cylinder, said cylinder having two sets of ports, said piston having two ports, one adapted to register with those of one of the sets in the cylinder and the other piston port being adapted to register with one of the other sets of cylinder ports, a fluid pressure chamber for supplying pressure to the piston, a valve for releasing pressure from said chamber, and means carried by said piston for opening said release valve upon a fall of pressure in said chamber.

3. A control valve of the character described, comprising a casing having a cylinder provided with two sets of ports, means for controlling the flow through the ports of one set, a hollow piston reciprocably mounted in said cylinder, said piston having one port adapted to register with one of the set of flow controlled ports of the cylinder and a second port adapted to register with one of the other set of ports of the cylinder, a chamber for fluid under pressure, said piston having a closed end and an open end, the latter and the corresponding end of the cylinder opening into said pressure chamber so that fluid will flow through the piston ports and through the registering cylinder ports, and means for resiliently opposing movement of the piston under the action of fluid pressure.

4. A control valve of the character described, comprising a casing having a cylinder provided with two sets of ports, means for controlling the flow through the ports of one set, a hollow piston reciprocably mounted in said cylinder, said piston having one port adapted to register with one of the set of flow controlled ports of the cylinder and a second port adapted to register with one of the other set of ports of the cylinder, a chamber for fluid under pressure, said piston having a closed end and an open end, the latter and the corresponding end of the cylinder opening into said pressure chamber so that fluid will flow through the piston ports and through the registering cylinder ports, the set of flow controlled cylinder ports serving to control the pressure in the piston and pressure chamber and the other set of cylinder ports serving to distribute fluid under pressure from the piston, and means for resiliently opposing movement of the piston under the action of fluid pressure.

5. A control valve of the character described, comprising a casing having a cylinder provided with two sets of ports, means for controlling the flow through the ports of one set, a hollow piston reciprocably mounted in said cylinder, said piston having one port adapted to register with one of the flow controlled ports of the cylinder and a second port adapted to register with one of the other set of ports of the cylinder, a chamber for fluid under pressure, said piston having a closed end and an open end, the latter and the corresponding end of the cylinder opening into said pressure chamber so that fluid will flow through the piston ports and through the registering cylinder ports, means for resiliently opposing movement of the piston under the action of fluid pressure, a valve for releasing the fluid from the pressure chamber, said piston having a series of grooves in the form of saw teeth, a rocking member, an escapement finger on the rocking member engageable with said teeth to permit free upward movement of the piston and to move downwardly with the piston, and means on said rocking member for opening the release valve upon downward movement of the piston.

6. A control valve of the character described, comprising a casing having a cylinder provided with two sets of ports, means for controlling the flow through the ports of one set, a hollow piston reciprocably mounted in said cylinder, said piston having one port adapted to register with one of the set of flow controlled ports of the cylinder and a second port adapted to register with one of the other set of ports of the cylinder, a chamber for fluid under pressure, said piston having a closed end and an open end, the latter and the corresponding end of the cylinder opening into said pressure chamber so that fluid will flow through the piston ports and through the registering cylinder ports, means for resiliently opposing movement of the piston under the action of fluid pressure, and means for modifying the size of the set of varying sized ports.

7. A control valve of the character described, comprising a casing having a cylinder provided with two sets of ports, means for controlling the flow through the ports of one set, a hollow piston reciprocably mounted in said cylinder, said piston having one port adapted to register with one of the set of flow controlled ports of the cylinder and a second port adapted to register with one of the other set of ports of the cylinder, a chamber for fluid under pressure, said piston having a closed end and an open end, the latter and the corresponding end of the cylinder opening into said pressure chamber so that fluid will flow through the piston ports and through the registering cylinder ports, means for resiliently opposing movement of the piston under the action of fluid pressure, the means for controlling the flow through the cylinder ports comprising a sleeve surrounding the portion of the cylinder provided with the set of flow controlled ports, said sleeve having ports registering with the ports of the cylinder, and means for displacing the sleeve to cover the openings of the ports of the cylinder.

8. A control valve of the character described, comprising a casing having a cylinder provided with two sets of ports, means for controlling the flow through the ports of one set, a hollow piston reciprocably mounted in said cylinder, said piston having one port adapted to register with one of the set of flow controlled ports of the cylinder and a second port adapted to register with one of the other set of ports of the cylinder, a chamber for fluid under pressure, said piston having a closed end and an open end, the latter and the corresponding end of the cylinder opening into said pressure chamber so that fluid will flow through the piston ports and through the registering cylinder ports, means for resiliently opposing movement of the piston under the action of fluid pressure, the means for controlling the flow through the cylinder ports comprising a sleeve surrounding the portion of the cylinder provided with the set of flow controlled ports, said sleeve having ports registering with the ports of the cylinder, means for rotating said sleeve comprising a series of teeth on said sleeve, and a reciprocable rack meshing with the teeth.

9. A control valve of the character described, comprising a casing having a cylinder provided with two sets of ports, means for controlling the flow through the ports of one set, a hollow piston reciprocably mounted in said cylinder, said piston having one port adapted to register with one of the set of flow controlled ports of the cylinder and a second port adapted to register with one of the other set of ports of the cylinder, a chamber for fluid under pressure, said piston having a closed end and an open end, the latter and the corresponding end of the cylinder opening into said pressure chamber so that fluid will flow through the piston ports and through the registering cylinder ports, means for resiliently opposing movement of the piston under the action of fluid pressure, the means for controlling the flow through the cylinder ports comprising a sleeve surrounding the portion of the cylinder provided with the set of flow controlled ports, said sleeve having ports registering with the ports of the cylinder, means for rotating said sleeve comprising a series of teeth on said sleeve, a reciprocable rack meshing with the teeth, and spring locking means for fixing the sleeve in different angular positions.

ADOLPHE KÉGRESSE.

REFERENCES CITED

The following references are of record in the file of this patent:

UNITED STATES PATENTS

| Number | Name | Date |
|---|---|---|
| 1,201,237 | Ashton | Oct. 17, 1916 |
| 1,780,471 | Galloway | Nov. 4, 1930 |
| 1,805,056 | Taylor | May 12, 1931 |
| 2,088,427 | Maurer | July 27, 1937 |
| 2,153,926 | Kégresse | Apr. 11, 1939 |